United States Patent [19]
Valenzuela et al.

[11] Patent Number: 5,092,999
[45] Date of Patent: Mar. 3, 1992

[54] FILTERING MEANS

[75] Inventors: Gabriel Valenzuela; Michael S. Diamond; Mark A. Posner, all of Inglewood; Cleo D. Mathis, South El Monte, all of Calif.

[73] Assignee: Ultra Flo, Inc., Inglewood, Calif.

[21] Appl. No.: 480,025

[22] Filed: Feb. 14, 1990

[51] Int. Cl.$^5$ .............. B01D 71/02; B01D 71/26; B01D 71/30
[52] U.S. Cl. ................ 210/321.72; 210/500.25; 210/500.26; 210/500.36
[58] Field of Search .............. 210/348, 391, 321.6, 210/405, 321.69, 407, 321.72, 409, 321.78, 435, 321.87, 446, 500.27, 450, 500.36, 451, 500.25, 453, 500.26, 454, 455, 456, 473, 477

[56] References Cited

U.S. PATENT DOCUMENTS

| | | | |
|---|---|---|---|
| 2,982,418 | 2/1961 | Balley | 210/448 |
| 3,450,207 | 6/1969 | Hirsch | 166/233 |
| 3,480,148 | 11/1969 | Bryand | 210/380 |
| 4,321,139 | 3/1982 | Auclair | 210/232 |
| 4,604,203 | 8/1986 | Kyle | 210/489 |
| 4,680,117 | 7/1987 | Freeman | 210/469 |
| 4,690,762 | 9/1987 | Katsura | 210/436 |
| 4,787,976 | 11/1988 | Parham et al. | 210/500.23 |
| 4,806,243 | 2/1989 | Jackson | 210/303 |

FOREIGN PATENT DOCUMENTS 240837 11/1986 German Democratic Rep. .

Primary Examiner—Frank Sever
Attorney, Agent, or Firm—Kenneth L. Sherman

[57] ABSTRACT

Filtering apparatus provided for separating contaminants from a fluid flow includes a hollow housing having an inlet and an outlet therein adapted to permit the flow of fluid therethrough, and a hollow, generally concave shaped, porous, self-supporting filtering membrane having an opening into the interior thereof at its base end. The filter membrane is secured in the housing intermediate the inlet and outlet, so that the fluid flow enters the interior portion of the filtering membrane through the opening at its base end and exits therefrom through the porous filtering membrane to the outlet.

52 Claims, 3 Drawing Sheets

FILTERING MEANS

BACKGROUND OF THE INVENTION

1. Field of the Invention

This invention relates generally to filtration, and, more particularly, to a filtering means for the removal of contaminants from a fluid flow.

2. Description of the Related Art

A very common requirement of several industries, such as chemical and biological manufacturing, food processing, ore processing, health care facilities, and water and waste treatment, is the separation of solids, as well as chemical and biological contaminants transported in liquids. Filtration is a principal means for effecting such separation.

Another growing segment of the market for filtration products is the residential user. News releases about contaminated sources of public and private drinking water supplies and increased public awareness of environmental concerns have led to an increasing consumer demand for filtration devices for improving the quality of residential drinking water. In some areas of the world, unsanitary water supplies are common and permit the introduction of biological vectors that, unless removed from the drinking and cooking water, cause wide-spread illness in the population.

In general, filtration requires that the suspension containing the contaminants be passed through a porous medium that either blocks the passage of particulates or biological vectors larger than the pore size of the medium or that absorbs the chemical contaminants. Thus, the porous medium prevents the continued passage of the contaminants in the fluid flow.

A problem with present filters is that to eliminate certain bacteriological vectors, or particulate contaminants of small size, a filtering membrane must be introduced into the fluid flow that contains porous passages that are smaller than the contaminant that is desired to be excluded from the fluid flow.

As there are generally a greater percentage of larger than smaller sized contaminants, the larger contaminants tend to accumulate and sediment against the finer filtering element and to plug or clog it rapidly, thus shortening its useful life expectancy. A common problem in this art is that the higher the efficiency of the filtering apparatus is in eliminating the smaller and smaller contaminants, the shorter and more costly is its use in the filtering system.

OBJECTS AND SUMMARY OF THE INVENTION

It is therefore an object of the present invention to provide a filtering apparatus having a lengthened life expectancy that yet provides the most efficient media for the removal of small sized contaminants.

Another object of the present invention is the provision of simple, inexpensive, easily installed and serviced apparatus for filtering water, or other liquids, having a longer in-use life and being free from moving parts, motors, pumps, adjustable valves, and the like.

Still yet, another object of the present invention is the provision of apparatus of the class described which is particularly useful in filtering and treating water used for commercial and residential use.

In summary, the present invention is found in an in-line or a canister-type filtering apparatus which includes a hollow housing having an inlet and an outlet therein adapted to permit the flow of fluid therethrough. A hollow, generally concave shaped, integrally formed, porous self-supporting filtering membrane having an opening into the interior thereof at its base end is provided as well as means for securing the filter membrane in the housing intermediate the inlet and outlet, so that the fluid flow enters the interior of the filtering membrane through the opening at its base end and exits therefrom through the porous filtering membrane to the outlet.

It is another object of the invention to provide a filtering membrane structure that provides both more surface area than existing filtering membranes of like diameter for filtering the fluid flow more efficiently per unit of time, and which introduces a chaotic turbulence into the fluid flow adapted to prevent the sedimentation of entrapped contaminants against the membrane surface that would otherwise clog the pores of the filtering membrane and prevent fluid flow therethrough.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT

Figure 1:
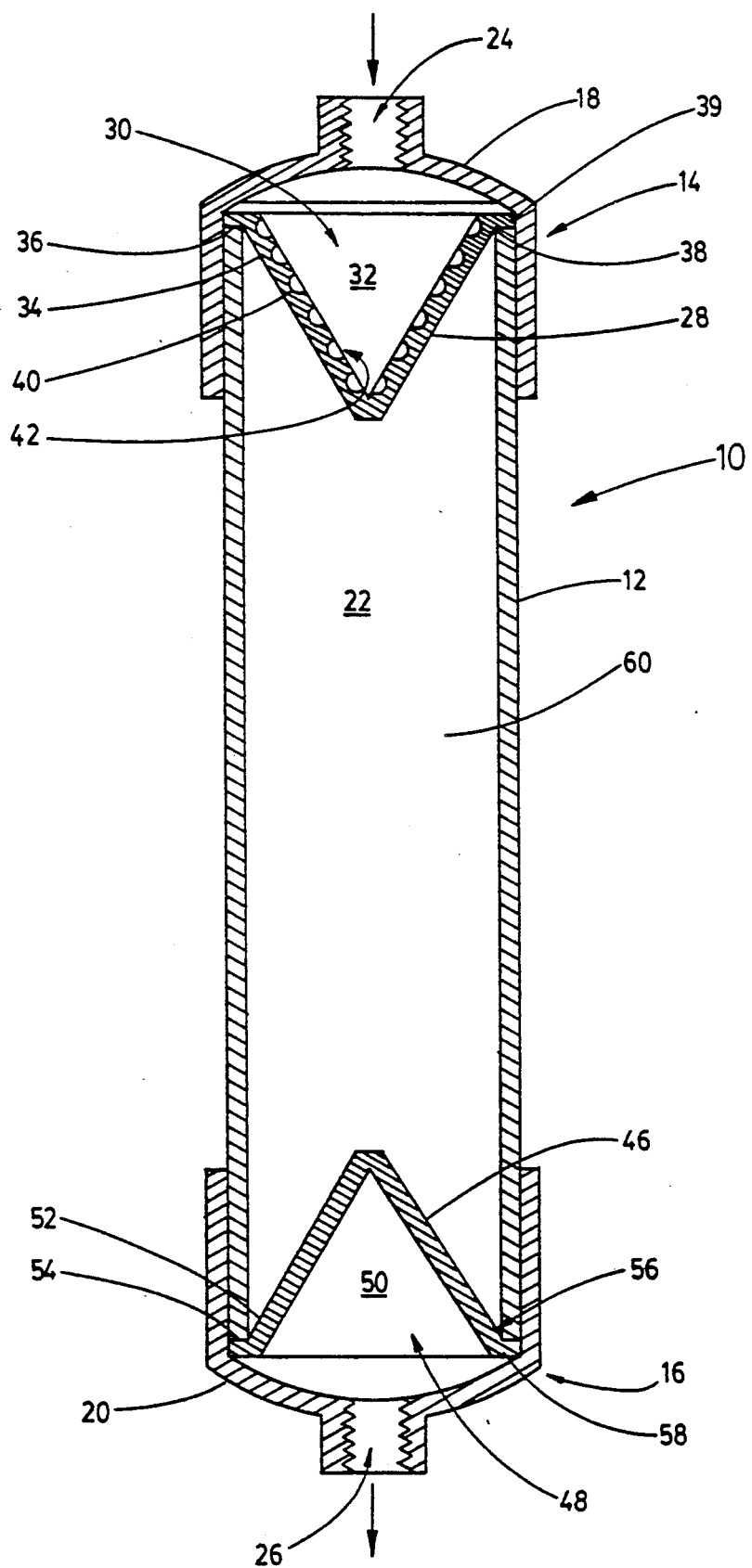
FIG. 1 is a cross-sectional view of a preferred embodiment of the present invention.

Referring now to the drawings, a filtering apparatus for separating contaminants from a fluid flow that embodies the present invention in a preferred construction, includes, as shown in FIG. 1, a housing 10 having a generally tubular, hollow body member 12, open on a first and a second end 14, 16, respectively. Housing 10 is preferably constructed from an inert or approved sanitary material such as metal or plastic that will not corrode, precluding the introduction of yet additional contaminants into the fluid flow. Polyvinylchloride or metal tubing is an acceptable item for such a hollow body member 12.

A first and second cap members, 18, 20, respectively, are adapted to sealingly mate with the first and second open ends 14, 16, of body member 12, respectively, so as to form an interior chamber 22, in which the filtration processes can occur in isolation from the environment. In order to permit the entry and exit of the fluid flow through the filtering apparatus, first and second cap members 18, 20, have an inlet 24, and an outlet 26, therein respectively, to permit fluid flow through the housing 10 as indicated by the flow arrows.

Figure 3:
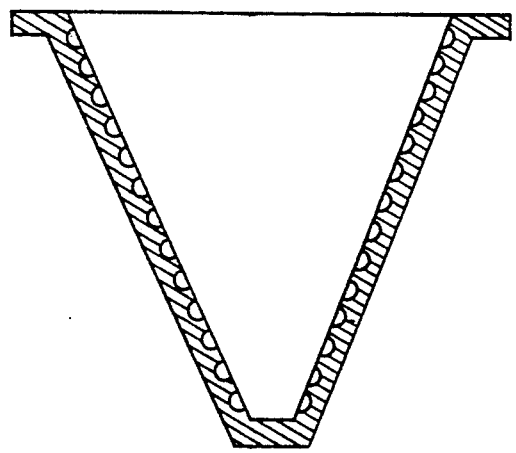
FIG. 3 is a cross-sectional view of a preferred embodiment of the present invention in a filtering membrane.
Figure 4A:
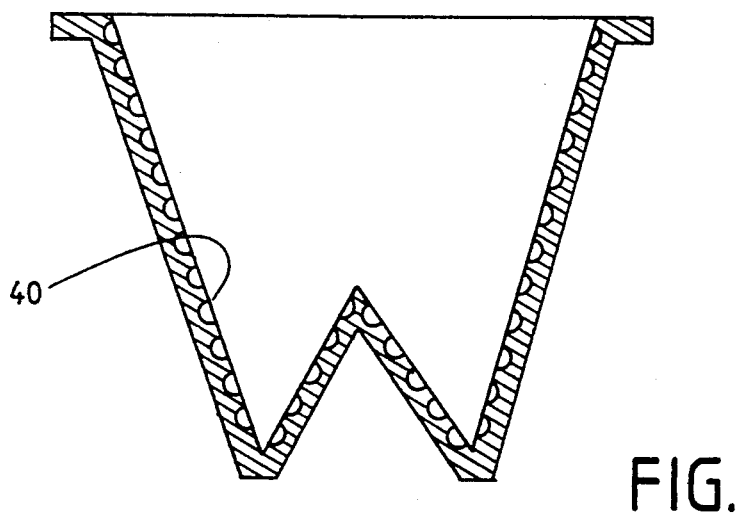
FIGS. 4a and 4b are cross-sectional views similar to that in FIG. 3 of alternate preferred embodiments of the present invention in a filtering membrane.
Figure 4B:
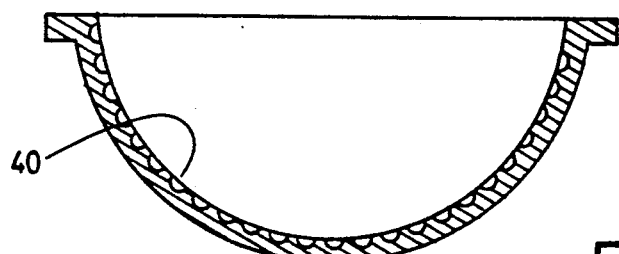

A first, hollow, generally concave shaped, porous filtering membrane 28, is retained for filtration of the fluid flow in housing 10, as is better described below. Filtering membrane 28 is fabricated from a generally rigid, porous material, such as polyethylene, polyamide, polytetrafluoride, polyester or even ceramic, and is preferably conical or frusto-conical in cross-section. FIGS. 3 and 4A and 4B, show other acceptable cross-sections for filtering membrane 28. FIG. 3 shows a frusto-conical cross-section as illustrated in the embodiment shown in FIGS. 1 and 2, while FIGS. 4A and 4B illustrate other preferred embodiments of cross-sections for filtering member 28.

Filtering member 28 has an opening 30 into its interior portion 32 at its base end 34, and a radially, outwardly extending lip portion 36 integrally formed about its base periphery 38.

Lip portion 36 is adapted to sealingly engage housing 10 intermediate the periphery 39 of first open end 14 of body member 12 and first cap member 18 in an abutting relationship, so as to secure filtering membrane 28 in housing 10 intermediate inlet 24 and outlet 26. The fluid flow enters the interior 32 of filtering member 28 generally axially through opening 30 at its base end 34 and exits therefrom through the porous body of the filtering member 28 to outlet 26.

While the invention is found in structure that has a filtering membrane with a smooth interior surface, it is preferred that the interior surface of filtering member 28 include means for creating fluid flow turbulence in the interior of the first filtering member 28 so as to provide a generally continuous disturbance of contaminants trapped therein. Thus, this continuous fluid flow turbulence in the interior of the filtering member will prevent any trapped contaminants from sedimenting against the interior surface of the first filtering member 28 and therein clogging the porous surface, tending to render the filtering membrane inoperative.

A preferred means for producing the desired fluid flow turbulence in the interior of the filtering member includes, as illustrated in FIGS. 1 through 4B, a plurality of helically spiraled grooves 40 formed in the interior surface 42 of the first filtering member 28 and adapted for providing a generally continuous disturbance of the fluid flow in the interior portion 32 of filtering member 28 and, consequently, also of the contaminants trapped by first filtering membrane 28. The helical nature of the grooves cause a swirling of the fluid flow generally parallel to the interior surface of the filtering membrane due to the diverting action the grooves impose on the otherwise generally perpendicular flow. By directing a portion of the fluid flow to keep the trapped contaminants in a suspended state, the filtering membrane will have an overall longer life expectancy than a structure in which the fluid flow remains generally laminar and urges entrapped contaminants to sediment against the interior surface of the first filtering membrane and clogging the porous interior surface of the filtering membrane.

While grooves are preferred to induce this fluid flow turbulence, any other method, such as ribs, fins, or protuberances formed on the interior of the filtering membrane, may also be used as these structures could also be adapted to urge a flow of fluid generally parallel to the interior surface of the first filtering member to produce chaotic continuous disturbance of contaminants trapped by the first filtering membrane in the interior of the first filtering membrane 28. The conical shape also tends to extend the life since a buildup in the apex of the cone will only affect a small part of the available filtering surface. As more and more sediment is collected, the available surface will become more occluded, but in a non-linear fashion.

A prefilter element 44 is secured in housing 10 intermediate inlet 24 of first cap member 18 and first filtering membrane 28 to trap large particulate contaminants, permitting fluid flow therethrough from inlet 24 into base opening 30 of first filtering membrane 28.

While the present invention is embodied in a structure having only a single filtering membrane such as that already described above, the preferred embodiment being described herein incorporates a second, hollow, generally concave shaped porous filtering membrane 46, fabricated from a generally rigid, porous material, and having an opening 48 into its interior 50 at its base end 52. A radially, outwardly extending lip portion 54, is preferably integrally formed about its base periphery 56.

Lip portion 54 of second filtering membrane 46, is adapted to sealingly engage housing 10 intermediate the periphery 58 of second open end 16 of body member 12 and second cap 20, in an abutting relationship, so as to secure second filtering membrane 46 in housing 10 intermediate inlet 24 and outlet 26, so that the fluid flow enters the interior 50 of filtering membrane 46 through opening 48 at its base end 52, and exits therefrom through the porous filtering membrane 46 to outlet 26.

While the present invention is also embodied in a structure as described above, the preferred embodiment being illustrated and described herein would also include a filter media 60. Preferred media would include activated, granular or block charcoal, or even fibrous material, interposed in housing 10 intermediate first and second filtering membranes 28, 46, respectively. To absorb chemical contaminants that may be dissolved in the fluid, activated charcoal, for example is a well known filtration material against many toxic or dangerous chemicals.

While the preferred embodiment of the invention described above is most conveniently found in an in-line filter, the present invention can also be utilized in an alternate embodiment such as is illustrated in FIG. 2, commonly known as a "canister filter." Similar reference numbers as described above have been used in FIG. 2 to refer to similar structural elements as described for the embodiment of the invention illustrated in FIG. 1.

Figure 2:
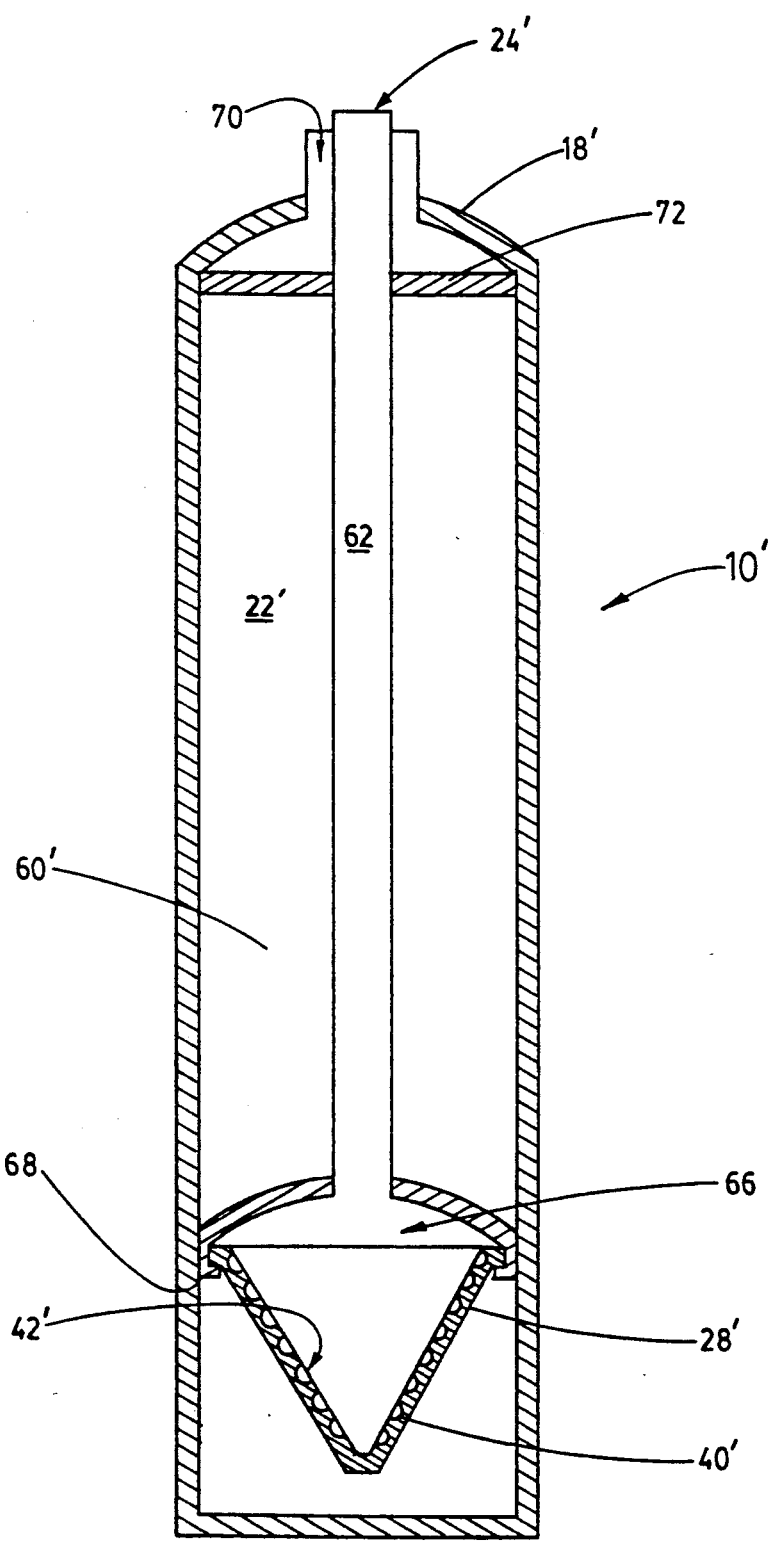
FIG. 2 is a cross-sectional view of an alternate preferred embodiment of the present invention.

With reference to FIG. 2, a preferred embodiment of the present invention in a canister type of filtering means for separating contaminants from a fluid flow includes a hollow housing 10' having an inlet 24' and an outlet 26' therein adapted to permit the flow of fluid therethrough.

A hollow, generally concave shaped porous filtering membrane 28', has an opening 30' into the interior 32' thereof at its base end 34'.

Inlet means are illustrated in FIG. 2 for communicating the fluid flow from inlet 24' to opening 30' into the interior 32' of filtering membrane 28', so that the fluid flow enters the interior 32' of filtering membrane 28' through opening 30' at its base end 34' and exits therefrom through porous filtering membrane 28'.

Preferred inlet means as illustrated in FIG. 2 for a canister type of structure include a hollow pipe member 62 open on a first and a second end 64, 66, respectively. First open end 64 communicates with inlet 24' and second open end 66 communicates with filtering membrane 28' so as to conduct the fluid flow therebetween.

Filtering membrane 28' further includes a radially, outwardly extending lip portion 36' about its base periphery 38. Lip portion 36' is adapted to sealingly engage the periphery 68 of second open end 66 of hollow pipe 62, so that the fluid flow enters the interior 32' of filtering membrane 28' through opening 30' at its base end 34' and exits therefrom through the porous filtering membrane to the below described outlet means.

Outlet means are also provided for communicating the fluid flow through porous, filtering membrane 28' to outlet 26'. As illustrated in FIG. 2, the outlet means is preferably an opening 70 in housing 10'. The fluid path is through filtering membrane 28' and filtering media 60' to opening 70. As in most canister type of filter, opening 70 may be either distinct from inlet pipe 62, or may, for economy, surround and contain inlet pipe 62 as illustrated. Both structures embody the present invention, as well as the addition of a post-filter 72 which may be either a planar or a concave shaped filtering membrane positioned in the fluid flow intermediate filtering membrane 28' and outlet 26'.

Prior art conical filters have required a combination of a support body and a filtration membrane incapable of retaining its shape or otherwise supporting itself against the force of the fluid flow. The use of a porous membrane material that is substantially rigid and self-supporting in the desired configuration provide the advantages over the prior art of an integral filtering member that is structurally integrated into the combination.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. Filtering means for separating contaminants from a fluid flow comprising:
   a housing having a generally tubular, hollow body member, open on a first and a second end, and a first and second cap member adapted to sealingly mate with said first and second open ends of said body member respectively,
   said first and second cap members further having an inlet and an outlet therein respectively, to permit fluid flow through said housing;
   a filtering membrane surface consisting of a first, hollow, generally conically shaped, porous, self-supporting filtering membrane, fabricated from a generally rigid, tunneled porous material, and having an opening into the interior thereof at its base end, and a radially, outwardly extending lip portion integrally formed about its base periphery,
   said lip portion adapted to sealingly engage said housing intermediate the periphery of said first open end of said body member and said first cap member in an abutting relationship, so as to secure said filtering membrane in said housing intermediate said inlet and outlet with the fluid flow entering the interior of said filtering membrane through said opening at its base end and exiting therefrom through said porous filtering membrane to said outlet;
   means for creating fluid flow turbulence in the interior of said first filtering membrane so as to provide a generally continuous disturbance of contaminants trapped by said first filtering membrane, thus preventing the contaminants from sedimenting against the interior surface of said first filtering membrane and clogging said porous filtering membrane;
   a prefilter element secured in said housing intermediate said inlet of said first cap member and said first filtering membrane permitting fluid flow therethrough from said inlet into said base opening of said first filtering membrane;
   a second, hollow, generally conically shaped, porous filtering membrane, fabricated from a generally rigid, porous material, and having an opening into its interior at its base end, and a radially, outwardly extending lip portion integrally formed about its base periphery,
   said lip portion of said second filtering membrane adapted to sealingly engage said housing intermediate the periphery of said second open end of said body member and said second cap in an abutting relationship, so as to secure said second filtering membrane in said housing intermediate said inlet and said outlet so that the fluid flow enters the interior of said filtering membrane through said opening at its base end and exits therefrom through said porous filtering membrane to said outlet; and,
   a filter media of activated, granular charcoal, interposed in said housing intermediate said first and second filtering membranes.

2. A filtering means as in claim 1 wherein said means for creating fluid flow turbulence includes a plurality of helically spiraled grooves formed in the interior surface of said first filtering member adapted for providing a generally continuous disturbance of contaminants trapped by said first filtering membrane, thus preventing the contaminants from sedimenting against the interior surface of said first filtering membrane and clogging said porous filtering membrane, by urging a flow of fluid generally parallel to the interior surface of said first filtering member to produce chaotic continuous disturbance of contaminants trapped by said first filtering membrane in the interior of said first filtering membrane.

3. A filtering means as in claim 1 wherein said means for creating fluid flow turbulence includes a plurality of protuberances formed on the interior surface of said first filtering member adapted for providing a generally continuous disturbance of contaminants trapped by said first filtering membrane, thus preventing the contaminants from sedimenting against the interior surface of said first filtering membrane and clogging said porous filtering membrane, by urging a flow of fluid generally parallel to the interior surface of said first filtering member to produce chaotic continuous disturbance of contaminants trapped by said first filtering membrane in the interior of said first filtering membrane.

4. Filtering means for separating contaminants from a fluid flow comprising:
   a hollow housing having an inlet and an outlet therein adapted to permit the flow of fluid therethrough;
   a filtering membrane surface consisting of a hollow, generally concave shaped, integrally formed, tunneled porous, self-supporting filtering membrane having an opening into the interior thereof at its base end; and means for securing said filter membrane in said housing intermediate said inlet and outlet, so that the fluid flow generally axially enters the interior of said filtering membrane through said opening at its base end and exits therefrom through said porous filtering membrane to said outlet.

5. Filtering means for separating contaminants from a fluid flow comprising:

a housing having a generally tubular, hollow body member, open on a first and a second end, and a first and second cap member adapted to sealingly mate with said first and second open ends of said body member respectively, said first and second cap members further having an inlet and an outlet therein respectively, to permit fluid flow through said housing; and, a filtering membrane surface consisting of a first, hollow, generally concave shaped, tunneled porous, self-supporting filtering membrane having an opening into the interior thereof at its base end, and a radially, outwardly extending lip portion integrally formed about its base periphery, said lip portion adapted to sealingly engage said housing intermediate the periphery of said first open end of said body member and said first cap member in an abutting relationship, so as to secure said filtering membrane in said housing intermediate said inlet and outlet so that the fluid flow enters generally axially the interior of said filtering membrane through said opening at its base end and exits therefrom through said porous filtering membrane to said outlet.

6. Filtering means as in claim 5 further including a prefilter element secured in said housing intermediate said inlet of said first cap member and said first filtering membrane, thereby permitting fluid flow therethrough from said inlet into said base opening of said first filtering membrane.

7. Filtering means as in claim 5 further including, a second, hollow, generally concave shaped, integrally formed, porous, self-supporting filtering membrane having an opening into its interior at its base end, and a radially, outwardly extending lip portion integrally formed about its base periphery, said lip portion of said second filtering membrane adapted to sealingly engage said housing intermediate the periphery of said second open end of said body member and said second cap in an abutting relationship, so as to secure said second filtering membrane in said housing intermediate said inlet and said outlet, thus permitting the fluid flow to enter the exterior surface of said second filtering membrane and to exit from the interior thereof through said opening at its base end to said outlet.

8. Filtering means as in claim 7 wherein said second filtering membrane has a porosity different from that of said first filtering membrane.

9. Filtering means as in claim 7 further including filter media interposed in said housing intermediate said first and second filtering membranes.

10. Filtering means as in claim 9 wherein said filter media comprises activated, granular charcoal.

11. Filtering means as in claim 9 wherein said filter media comprises activated, block charcoal.

12. Filtering means as in claim 5 wherein said generally rigid, porous, selfsupporting material is polyethylene.

13. Filtering means as in claim 5 wherein said generally rigid, porous selfsupporting material is polyamide.

14. Filtering means as in claim 5 wherein said generally rigid, porous self-supporting material is polytetrafluoride.

15. Filtering means as in claim 5 wherein said generally rigid, porous self-supporting material is polyester.

16. Filtering means as in claim 5 wherein said generally rigid, porous self-supporting material is ceramic.

17. Filtering means as in claim 5 further including:

means for creating fluid flow turbulence in the interior of said first filtering membrane so as to provide a generally continuous disturbance of contaminants trapped by said first filtering membrane, thus preventing the contaminants from sedimenting against the interior surface of said first filtering membrane and clogging said porous filtering membrane.

18. Filtering means as in claim 17 wherein said means for creating fluid flow turbulence comprises a plurality of grooves formed in the interior surface of said first filtering member adapted for urging a flow of fluid generally parallel to the interior surface of said first filtering member.

19. Filtering means as in claim 18 wherein said grooves are helically spiraled.

20. Filtering means as in claim 17 wherein said means for creating fluid flow turbulence comprises a plurality of protuberances integrally formed in the interior surface of said first filtering member adapted for urging a flow of fluid generally parallel to the interior surface of said first filtering member.

21. Filtering means as in claim 17 wherein said means for creating fluid flow turbulence produces chaotic continuous disturbance of contaminants trapped by said first filtering membrane in the interior of said first filtering membrane.

22. Filtering means for separating contaminants from a fluid flow for use with a hollow housing having an inlet and an outlet therein adapted to permit the flow of fluid therethrough, the filtering means comprising:

a filtering membrane surface consisting of a hollow, generally concave shaped, integrally formed, tunneled porous, self-supporting filtering membrane having an opening into the interior thereof at its base end, and a radially, outwardly extending lip portion about its base periphery, and means adapted for securing said filter membrane in the housing intermediate the inlet and outlet, so that the fluid flow generally axially enters the interior of said filtering membrane through said opening at its base end and exits therefrom through said porous filtering membrane to the outlet.

23. Filtering means as in claim 22 wherein said lip portions of said filtering member is integrally formed with said filtering member.

24. Filtering means as in claim 22 wherein said self-supporting material is polyethylene.

25. Filtering means as in claim 22 wherein said self-supporting material is polyamide.

26. Filtering means as in claim 22 wherein said self-supporting material is polytetrafluoride.

27. Filtering means as in claim 22 wherein said self-supporting material is polyester.

28. Filtering means as in claim 22 wherein said self-supporting material is ceramic.

29. Filtering means as in claim 22 further including:
means for creating fluid flow turbulence in the interior of said filtering membrane so as to provide a generally continuous disturbance of contaminants trapped by said filtering membrane, thus preventing the contaminants from sedimenting against the interior surface of said filtering membrane and clogging said porous filtering membrane.

30. Filtering means as in claim 29 wherein said means for creating fluid flow turbulence comprises a plurality of grooves formed in the interior surface of said filtering member adapted for urging a flow of fluid generally parallel to the interior surface of said filtering member.

31. Filtering means as in claim 30 for separating contaminants from a fluid flow wherein said grooves are helically spiraled.

32. Filtering means as in claim 29 wherein said means for creating fluid flow turbulence comprises a plurality of protuberances formed in the interior surface of said filtering member adapted for urging a flow of fluid generally parallel to the interior surface of said filtering member.

33. Filtering means as in claim 29 wherein said means for creating fluid flow turbulence in the interior of said filtering membrane produces chaotic continuous disturbance of contaminants trapped in the interior of said filtering membrane.

34. Filtering means as in claim 22 wherein at least a portion of said filtering membrane is generally conically shaped.

35. Filtering means for separating contaminants from a fluid flow comprising:
a hollow housing having an inlet and an outlet therein adapted to permit the flow of fluid therethrough;
a filtering membrane surface consisting of a hallow, generally concave shaped tunneled porous, self-supporting filtering membrane having an opening into the interior thereof at its base end;
inlet means for communicating the fluid flow from said inlet to said opening into the interior of said filtering membrane, so that the fluid flow generally axially enters the interior of said filtering membrane through said opening at its base end and exits therefrom through said porous filtering membrane; and
outlet means for communicating the fluid flow through said porous, filtering membrane to said outlet.

36. Filtering means as in claim 35 wherein said inlet means comprises a tubular, hollow body member, open on a first and a second end, said first open end communicating with said inlet and said second open end communicating with said filtering membrane so as to conduct the fluid flow therebetween.

37. Filtering means as in claim 36 wherein said filtering membrane further includes a radially, outwardly extending lip portion integrally formed about its base periphery,
said lip portion adapted to sealingly engage the periphery of said second open end of said tubular, hollow body member so that the fluid flow enters the interior of said filtering membrane through said opening at its base end and exits therefrom through said porous filtering membrane to said outlet means.

38. Filtering means as in claim 35 wherein said outlet means comprises an opening in said hollow housing.

39. Filtering means as in claim 38 wherein said opening in said hollow housing contains said inlet means therein.

40. Filtering means for separating contaminants from a fluid flow comprising:
a hollow housing having an inlet and an outlet therein adapted to permit the flow of fluid therethrough;
a filtering membrane surface consisting of at least one hollow, generally tunneled concave shaped porous, self-supporting filtering membrane having an opening into the interior thereof at its base end; and
means for securing said filter membrane in said housing intermediate said inlet and outlet, so that the fluid flow generally axially enters the interior of said filtering membrane through said opening at its base end and exits therefrom through said porous filtering membrane to said outlet.

41. Filtering means as in claim 40 wherein said filtering membrane further includes a radially, outwardly extending lip portion about its base periphery adapted for securing said filter membrane in the housing intermediate the inlet and outlet, so that the fluid flow enters the interior of said filtering membrane through said opening at its base end and exits therefrom through said porous filtering membrane to the outlet.

42. Filtering means as in claim 41 wherein said lip portion of said filtering member is integrally formed with said filtering member.

43. Filtering means as in claim 40 wherein said self-supporting porous material is polyethylene.

44. Filtering means as in claim 40 wherein said self-supporting material is polyamide.

45. Filtering means as in claim 40 wherein said self-supporting material is polytetrafluoride.

46. Filtering means as in claim 40 wherein said self-supporting material is polyester.

47. Filtering means as in claim 40 wherein said self-supporting material is ceramic.

48. Filtering means as in claim 40 further including:
means for creating fluid flow turbulence in the interior of said filtering membrane so as to provide a generally continuous disturbance of trapped contaminants, thus preventing the contaminants from sedimenting against the interior surface of said filtering membrane and to clog said porous filtering membrane.

49. Filtering means as in claim 48 wherein said means for creating fluid flow turbulence comprises a plurality of grooves formed in the interior surface of said filtering member adapted to urge a flow of fluid generally parallel to the interior surface of said filtering member.

50. Filtering means as in claim 49 wherein said grooves are helically spiraled.

51. Filtering means as in claim 48 wherein said means for creating fluid flow turbulence comprises a plurality of protuberances integrally formed on the interior surface of said filtering member adapted to urge a flow of fluid generally parallel to the interior surface of said filtering member.

52. Filtering means as in claim 48 wherein said means for creating fluid flow turbulence produces chaotic continuous disturbance of contaminants trapped by said filtering membrane in the interior of said filtering membrane.

* * * * *